May 7, 1957 H. J. BAILEY 2,791,680
HEADLIGHT WITH FOG LENS ATTACHMENT
Filed Oct. 23, 1953
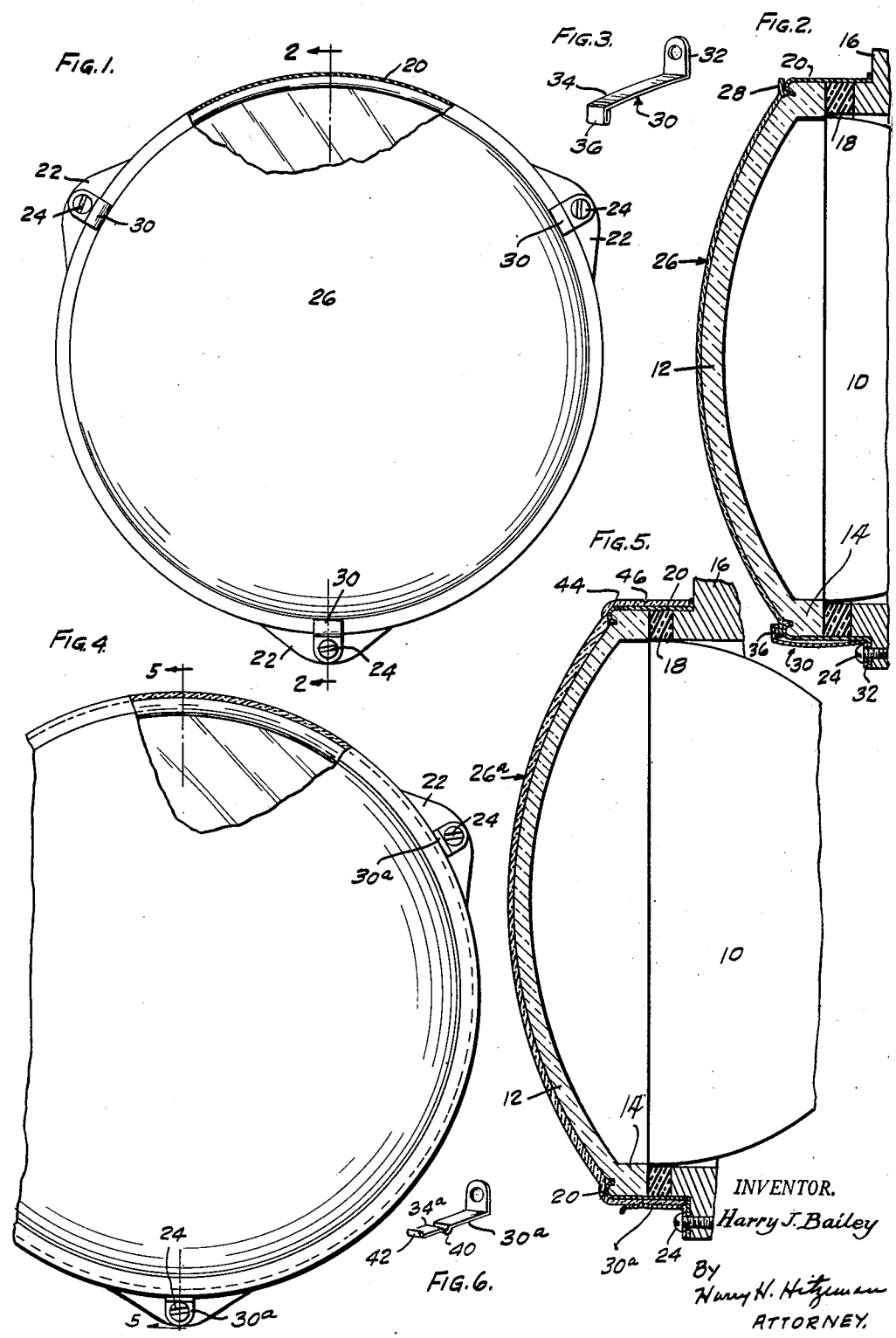
INVENTOR.
Harry J. Bailey
By
Harry H. Hitzeman
ATTORNEY.

United States Patent Office 2,791,680
Patented May 7, 1957

2,791,680

HEADLIGHT WITH FOG LENS ATTACHMENT

Harry J. Bailey, Chicago, Ill.

Application October 23, 1953, Serial No. 387,903

1 Claim. (Cl. 240—46.59)

My invention relates to detachable or snap-on fog lens attachments for headlights of automotive vehicles.

My invention relates more particularly to a fog lens and fastening means therefor which is comparatively simple in construction and capable of easy and quick attachment on presently existing vehicle headlights.

Fog lenses are usually attached to the existing headlights of automotive vehicles temporarily and have to be removed when the emergency ceases. In the case of fog lenses this is due to the fact that white light is reflected by small water drops suspended in the air or by large drops falling through the air in sufficient density to such an extent that a back glare is produced, while illumination in front ceases. This condition may be improved by using monochromatic light of the shorter wave lengths, amber colored light being usually chosen. Such monochromatic amber colored light is, however, not suitable for normal use as it reduces the obtainable illumination very markedly. Therefore, this type of light is only usable in the above explained case and has to be removed as soon as the emergency ceases. Fog lenses therefore should be made removable and capable of quick and easy attachment and detachment.

The attachment of fog lenses on the headlights is, however, connected with certain difficulties. The headlights are frequently mounted behind the fenders and merely the lens and lens mount is projecting. Glass lenses can only be used if fixedly mounted and firmly held and such mounting is difficult to obtain on account of the spherical or curved shape of the headlight lenses. If mounted at a distance water penetrates into the space between the lens, is evaporated by the head of the beam and condenses on the fog lenses which are cooled by the cold air, thus reducing the illumination obtained very markedly.

According to my invention, the fog lens is attached to the headlight in such a manner that the space between the fog lens and the headlight lens is tightly sealed, so that neither the outer fog carrying air nor water can penetrate into the said space.

Another feature of my invention resides in the fact that the attaching means will be permanently connected to the vehicle headlight and the fog lens applied or removed in an instant, the fog lenses normally being carried in the glove compartment or other equally accessible interior storage space in the vehicle.

Another feature of my invention resides in the fact that in addition to the fog lens itself, all that is required is a few spring clip members which may be permanently attached to the headlight, and at any time the fog lens may be attached or removed by a snap-on action.

While I shall illustrate and describe two embodiments of the invention herein, it is not limited to these embodiments, as will be clear from the following description wherein reference is had to the accompanying drawings, upon which:

Fig. 1 is a front elevational view of an automobile headlight with my improved fog lens attachment connected thereto, parts being broken in section to more clearly show other parts;

Fig. 2 is a vertical sectional view thereof taken on the line 2—2 of Fig. 1;

Fig. 3 is a perspective view of the spring clip member which I employ for fastening on the fog lens;

Fig. 4 is a front elevational view of an automobile headlight showing a modified construction of fog lens and attachment;

Fig. 5 is a vertical sectional view thereof taken on the line 5—5 of Fig. 4; and Fig. 6 is a front perspective view of the clip member which I employ in connection with the construction shown in Figs. 4 and 5.

In the embodiment of the invention which I have chosen to illustrate and describe the same, I have shown an automotive vehicle headlight having the usual bulb 10, the bulb 10 being integrally formed with a lens 12 of spherical segmental shape. The bulb 10 also has an annular ridge 14 around the periphery of the bulb lens, by means of which the light bulb is firmly positioned in the headlight frame 16 against a compressible ring basket 18 which fits around the bulb adjacent the annular ridge 14. The bulb is thus held in position in the headlight frame by a sheet metal retaining ring 20 which is provided with a plurality of ears 22 that have openings to receive the screw members 24 that fasten into suitable tapped openings in the headlight frame 16.

This is the usual construction which is found in a large number of standard types of automobiles at present on the market, and thus the easy adaptability of the fog lens which I provide and its easy and quick attachment or removal will be readily apparent hereinafter.

I provide a fog lens 26 of translucent plastic, dished to fit over the spherical segment 12 of the bulb lens, the fog lens having a flattened peripheral ledge 28 which when installed bears against the forward edge of the retaining ring 20. To hold the translucent fog lens 26 in position on the front surface of the lens 12 of the headlight bulb 10, I have provided a plurality of spring clip members 30. Each of the members 30 has an upstanding ledge portion 32 with an opening therethrough, and an arm 34 terminating in a finger portion 36 which, when the spring clip members are fastened in position, yieldingly presses against the forward edge of the retainer ring 20.

With the spring clip members provided and their fastening upon the same screws 24 that hold the headlight in the frame 16, it can be seen that when a situation arises where fog lights or fog lenses are desirable, it is a simple matter for an operator of a vehicle to take the fog lenses 26 from the glove compartment or other storage place in the vehicle, and by springing the arms 34 outwardly, the fog lens can be positioned against the bulb lens 12 and the fingers will snap into position to frictionally hold the fog lens against the bulb lens of the vehicle headlight. It is thus apparent that the attachment or removal of the fog lens requires only a matter of seconds and the operation can be performed by any normal driver of an automotive vehicle.

In the embodiment of the invention shown in Figs. 4 to 6, I have shown similar spring clip members 30a which are fastened permanently to the headlight frame by the screw members 24. The clip members differ from those shown in Figs. 1 to 3 in that the arm 34a has a ridge 40 therein with the forward edge 42 of the arm terminating short of the end of the retainer ring 20. With this construction I provide a fog lens 26a which is shaped to fit over the spherical segment 12 of the headlight bulb 10, and in addition it is provided with a flange or skirt portion 44 which fastens over the outside of the retainer ring 20. The skirt 44 may be provided with a peripheral groove 46 so positioned that when the skirt is pushed forward over the retainer ring 20, the ridges 40 of the spring clip member 30a will snap into position in the peripheral groove 46 and thus firmly hold the fog lens against the surface of the lens 12 of the bulb 10. If desired, the fog lens 26 may be comparatively thin at a point adjacent its center with the thickness of the wall spreading outwardly as it approaches the peripheral edge of the bulb lens 12.

From the foregoing description it can be seen that I have provided a convenient means for holding a fog lens against the bulb lens of an automotive vehicle headlight by the use of a minimum of extra parts over those that are at present standard equipment upon most automotive vehicle headlights. The spring clip members can be attached on the screws which hold the headlight bulb in position, and at any time when the atmosphere becomes foggy, the operator of the vehicle can place the fog lenses in operative position on the bulb lenses with a minimum of effort and in a minimum length of time.

What is claimed is:

The combination with an automotive vehicle headlight having a bulb with a lens of spherical segmental shape, a headlight frame to receive the same, a retaining ring adapted to telescope over an annular ridge around the periphery of said bulb lens and screws for fastening said retaining ring to said frame, of a fog lens of translucent plastic shaped to fit over the spherical segment of said bulb lens and be in contact therewith and having a skirt portion encircling a portion of said retaining ring, a plurality of clip members fastened to said headlight frame and yieldingly holding said fog lens in place, said clip members each having a spring finger extending over a portion of said skirt portion, said skirt portion having an annular grove therein and said clip members each having an inwardly projecting ridge engaging in said annular groove.

References Cited in the file of this patent

UNITED STATES PATENTS

| | | |
|---|---|---|
| 2,199,014 | Stitt | Apr. 30, 1940 |
| 2,246,808 | McKechnie | June 24, 1941 |
| 2,253,616 | Falge | Aug. 26, 1941 |
| 2,426,093 | Hardman | Aug. 19, 1947 |
| 2,472,850 | Plant | June 14, 1949 |
| 2,499,555 | Wronkowski | Mar. 7, 1950 |
| 2,668,903 | Barcus | Feb. 9, 1954 |
| 2,698,375 | Schmidt | Dec. 28, 1954 |

FOREIGN PATENTS

| | | |
|---|---|---|
| 259,796 | Great Britain | Oct. 21, 1926 |

OTHER REFERENCES

Aske Products Inc., Fisher Bldg., Detroit, Mich., advertising sheet (2 pp.) "Safelite," received in Patent Office, Apr. 27, 1950.